US008400920B2

(12) United States Patent
Lyonnet et al.

(10) Patent No.: US 8,400,920 B2
(45) Date of Patent: Mar. 19, 2013

(54) METHOD FOR OPTIMIZING THE TRANSFER OF INFORMATION IN A TELECOMMUNICATION NETWORK

(75) Inventors: Frank Lyonnet, Bourg la Reine (FR); Michel Delattre, Boulogne (FR)

(73) Assignee: Ipanema Technologies, Fontenay-aux-Roses (FR)

( * ) Notice: Subject to any disclaimer, the term of this patent is extended or adjusted under 35 U.S.C. 154(b) by 993 days.

(21) Appl. No.: 12/376,046

(22) PCT Filed: Aug. 13, 2007

(86) PCT No.: PCT/EP2007/058352
§ 371 (c)(1), (2), (4) Date: Feb. 2, 2009

(87) PCT Pub. No.: WO2008/025666
PCT Pub. Date: Mar. 6, 2008

(65) Prior Publication Data
US 2010/0008224 A1    Jan. 14, 2010

(30) Foreign Application Priority Data
Aug. 16, 2006 (FR) ...................................... 06 53377

(51) Int. Cl.
*H04J 1/16* (2006.01)
(52) U.S. Cl. ........................................ 370/231; 370/465
(58) Field of Classification Search ........................ None
See application file for complete search history.

(56) References Cited

U.S. PATENT DOCUMENTS

| 5,359,593 | A | 10/1994 | Derby et al. | |
|---|---|---|---|---|
| 6,594,246 | B1 * | 7/2003 | Jorgensen | 370/338 |
| 6,996,387 | B2 * | 2/2006 | Chan | 455/301 |
| 7,333,434 | B2 | 2/2008 | Grenot et al. | |
| 7,472,064 | B1 * | 12/2008 | Guo et al. | 704/256.2 |
| 7,940,756 | B1 * | 5/2011 | Duffy et al. | 370/389 |
| 2006/0031469 | A1 * | 2/2006 | Clarke et al. | 709/224 |
| 2007/0115825 | A1 * | 5/2007 | Roberts | 370/235 |
| 2009/0077210 | A1 * | 3/2009 | Musman et al. | 709/223 |

FOREIGN PATENT DOCUMENTS

| EP | 1 252 744 | 10/2002 |
|---|---|---|
| FR | 2 842 677 A1 | 1/2004 |

OTHER PUBLICATIONS

International Preliminary Examination Report (IPER) dated Apr. 2, 2009, received in PCT/EP2007/058352 (English translation thereof).

* cited by examiner

*Primary Examiner* — Kevin C Harper
*Assistant Examiner* — Samina Choudhry
(74) *Attorney, Agent, or Firm* — Miles & Stockbridge P.C.

(57) ABSTRACT

A method for optimizing the transfer of information in a telecommunications network which includes producers of information $P_i$, consumers of information $C_j$, and means of transferring the information between the producers and the consumers within the framework of applications $A_k$. The method includes defining an objective of quality of experience QoE and a level of Criticality of the Consumers $C_j$ and/or of the Applications $A_k$ representing the relative importance of said Applications $A_k$ and/or of said Consumers $C_j$, determining continuously the actual quality of experience 'QoE' for at least one consumer, determining dynamically the operating instructions for the transfer of information from the producers $P_i$ to the consumers $C_j$ according to the means of transfer available, and adapting dynamically and continuously the means of transfer of information according to the instructions defined.

15 Claims, 5 Drawing Sheets

METHOD FOR OPTIMIZING THE TRANSFER OF INFORMATION IN A TELECOMMUNICATION NETWORK

TECHNICAL FIELD

The invention pertains to the field of telecommunications networks and relates more specifically to a method for optimising the transfer of information in a telecommunications network comprising a plurality of producers of information $P_i$, a plurality of consumers of information $C_j$, and means of transfer of said information between said producers and said consumers within the framework of a plurality of applications $A_k$.

The invention also relates to a device for optimising the transfer of information in a telecommunications network comprising a plurality of producers of information, a plurality of consumers of information and means of transfer of said information between said producers and said consumers.

PRIOR ART

The configuration of a system for optimising the transfer of information of a communications network aiming to maximize the performance perceived by the consumers is a complex operation, in particular due to the fact that it is difficult to establish a link between the parameters of the system and the perceived performance in a context where the consumption of information and the means of transfer vary.

Indeed, the known systems for optimising the transfer of information of a communications network are configured according to criteria that are proper to the means of transfer and/or to the consumption of information without a direct link with the perceived performance.

Furthermore, in the methods for optimising the transfer of information of prior art, the quality of service levels agreed upon between operators and users of services, i.e. the SLA (Service Level Agreement), are not described as parameters expressing the perceived performance but as SLS parameters (Service Level Specifications) expressing the performance of information transfer in packet mode such as jitter, delay, loss, or the availability of the service.

These systems are generally configured according to an estimate of the impact of a certain parameter value on the perceived performance. These parameters also depend on the means of transfer and of the consumption of information and must be revised each time the means of transfer and/or the consumption of information vary substantially. In communications networks comprising numerous changes in terms of means of transfer and/or of consumption of information, this task becomes humanly impossible. This results in that the performance perceived by the end user of a service is not controlled.

Patent EP 1252744 of the applicant describes a method and a device for dynamic optimization of the quality of service in a packet mode data transmission network, wherein a plurality of sources Si and a plurality of destinations Di are connected to a transit network via a plurality of access networks, each source being able to send data at a maximum speed $L_{max,s,x}$, and each destination being able to receive data at a maximum speed $L_{max,x,d}$, said sources each comprising a means of classifying and of controlling the speed of the data emitted. The method described in this document optimizes the quality of transfer of the information according to parameters consisting of objectives expressed as quantifiable performance limited to the SLS parameters of a packet transmission service although the expected service from a communication network is a data transfer service. It does not allow for the direct translation of the objectives of perceived performance. Therefore, the optimization mechanisms may not produce the expected results and there is a real difficulty in carrying out the translation of the objectives.

The purpose of the invention is to overcome the insufficiencies of prior art described hereinabove by means of a method and of a device that constantly and automatically adapt the data transfers by observing the results in terms of quality of experience QoE representing the capacity of a consumer to make use of the information transferred within the framework of any application implemented in the network.

DESCRIPTION OF THE INVENTION

The invention advocates a method for optimising the transfer of information in a telecommunications network comprising a plurality of producers of information $P_i$, a plurality of consumers of information $C_j$, and means of transfer of said information between said producers and said consumers within the framework of a plurality of applications $A_k$.

The method according to the invention comprises the following steps:

a—defining an objective of quality of experience QoE representing the capacity of a consumer $C_j$ to make use of the information transferred within the framework of each application $A_k$ implemented in the network and a level of Criticality of the Consumers $C_j$ and/or of the Applications $A_k$ representing the relative importance of said Applications $A_k$ and/or of said Consumers $C_j$, b—determining continuously at least one parameter representing the actual quality of experience 'QoE' pour at least one consumer, c—determining dynamically the operating instructions of the transfer of information from the producers $P_i$ to the consumers $C_j$ according to the means of transfer available, d—adapting dynamically and continuously said means of transfer of information according to the instructions defined in the step c).

The method according to the invention further comprises the following steps:

determining the rules of arbitration between different data flows exchanged via the network for the use of the means of transfer, determining the rules for using the means of transfer in such a way as to allocate said means according to the type of flow, determining the types of flow adaptation to be carried out during the transfer, configuring each adaptation defined in the preceding step in such a way as to make use of the space of possible values of said operating parameters in order to better satisfy the totality of the needs of the applications making use of the information transmitted via the network.

Preferentially, the adaptation of the means of transfer further comprises the following steps:

adjusting dynamically the operating instructions of the transfer of information according, on the one hand, to the effects on the transfer of the mechanisms for selective acceleration, compression and rendering reliable, and on the other hand, to the impact on the quality of operation 'QoE' perceived by the consumer of the information, adjusting dynamically the operating parameters of the mechanisms for selective acceleration, compression and protection in such a way as to reduce the load emitted in the network while still controlling the quality of operation 'QoE' perceived by the consumer of the information.

According to the invention, in the event of a flow controlled from end to end, said adaptation comprises at least one selective acceleration allowing for the use of the resources of the network optimising the performance of the applications making use of the information transmitted via said network.

According to the invention, in the event of a flow with high data redundancy, said adaptation comprises at least one compression of the information transiting via the network.

According to the invention, in the event of a set of flows with redundant information, said adaptation comprises a restitution of the information via an indexing and a temporary memorization of the redundant information.

According to the invention, in the event of elastic flows, said adaptation comprises a dynamic distribution of input flows in the network for each type of flow.

According to the invention, in the event of flow exchanged in real time, said adaptation comprises at least one optimization of the integrity of the information by mechanisms for enhancing the reliability.

According to the invention, in the event of flows that can flow via several paths, said adaptation comprises a selection of an optimal path.

According to the invention, in the event of audio data transfers, the parameter representing the quality of operation 'QoE' is the MOS (Mean Opinion Score) measured by algorithms for estimating the audible quality.

According to the invention, in the event of the transfer of video data, the parameter representing the quality of operation 'QoE' is an MDI (Media Delivery Index) measured by algorithms for estimating the visual quality.

According to the invention, in the event of applications proceeding with client-server interactions, the parameter representing the quality of operation 'QoE' is the transaction delay characterized by the latency of the consumer between the sending of his query to a producer of data and the reception of the last information unit produced for this query.

According to the invention, in the event of a transfer of information in the form of packets transmitted without dynamic transformation taking into account the state of the network, the state of the Producer-Consumer synchronization or the content of said packets, the parameter representing the quality of operation 'QoE' is one of the following parameters: the absolute transfer latency of the packets, the jitter of these packets, the packet loss rate or a transfer speed.

In all cases wherein a multiplicity of indicators intervenes in order to characterize the perceived performance, the parameter representing the quality of operation 'QoE' is an AQS (for Application Quality Score) index representing the rate of availability of the totality of the performance objectives set for a given application.

The method according to the invention is implemented by a device for optimising the transfer of information in a telecommunications network comprising a plurality of producers of information, a plurality of consumers of information and means of transfer of said information between said producers and said consumers, said device comprising:

a—means for defining an objective of quality of experience QoE representing the capacity of a consumer $C_j$ to make use of the information transferred within the framework of each application $A_k$ implemented in the network and a level of Criticality of the Consumers $C_j$ and/or of the Applications $A_k$ representing the relative importance of said Applications $A_k$ and/or of said Consumers $C_j$, b—means for continuously determining at least one parameter representing the actual quality of experience 'QoE' for at least one consumer, c—means for dynamically determining the operating instructions of the transfer of information from the producers $P_i$ to the consumers $C_j$ according to the means of transfer available.

Preferentially, this device comprises a plurality of distributed modules comprising:

a module M1 in charge of discriminating the flow of data of producers and of applications making use of said flow, a module M2 in charge of adapting the recognized flow of data in order to carry out a transfer of information that complies with the criteria and with the priorities optimising the quality of operation 'QoE' perceived by the consumer of the information, a module M3 in charge of quantifying said quality of operation 'QoE' perceived by the consumer of the information, a module M4 in charge of estimating the means of transfer available within said network, a module M5 in charge of selecting the transfer parameters optimising said quality of operation 'QoE', a module M6 in charge of coordinating the preceding modules in order to implement a chosen policy of maximizing the performance of the applications making use of the information exchanged via the network.

In order to select the transfer parameters that optimize said quality of operation 'QoE, said module M5 comprises a software implementing either a fuzzy logic based processing, or a Bayesian network based processing, or a decision tree based processing, or a neural network based processing, or an empirical model based processing.

Thanks to the invention the complexity of the configuration of such a device is reduced.

Furthermore, it is not necessary to define parameters that are proper to the means of transfer and/or to the consumption of information, and it is also not necessary to revise the parameters when the means of transfer and/or the consumption of information vary.

Moreover, the perceived performance is no longer subject to the correct configuration of the mechanisms according to the means of transfer and/or of the consumption of information.

BRIEF DESCRIPTION OF THE DRAWINGS

Other characteristics and advantages of the invention shall appear in the following description, taken by way of a non-exhaustive example, in reference to the annexed figures wherein.

DETAILED DESCRIPTION OF PARTICULAR EMBODIMENTS

Figure 1:
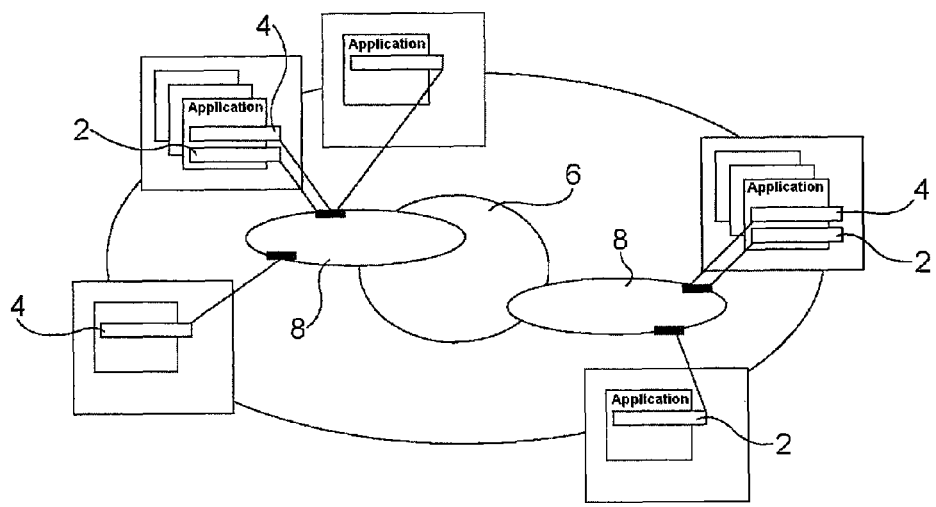
FIG. 1 shows a general diagram of a distributed information system around a network wherein is implemented the method according to the invention.

The network shown in FIG. 1, comprises a plurality of producers of information $P_i$ 2, a plurality of consumers of information $C_j$ 4, and means of transfer of said information between said producers 2 and said consumers 4 within the framework of a plurality of applications $A_k$.

In the rest of this description, the means of transfer designate all of the mechanisms making it possible to deliver information according to an exchange protocol defined between producers 2 and consumers 4, the term communication designating the transfer of information as well as the exchange protocol between communicating entities or between communicating and intermediary entities.

The Consumption of information within the communications network stands for all of the information that the Consumers can make use of and is delivered by the producers 2 at each instant.

The performance perceived by the consumers 4 within the framework of an application $A_k$ stands for the capacity of these consumers to make productive use of the information transferred. In what follows, the term "End-user QoE" (Quality of Experience) or "QoE" shall be used as a synonym of the performance perceived by the consumers 4.

The producers 2 and the consumers 4 are considered in the sense of applications using software and/or hardware resources in order to provide a service to the end consumer.

The applications can be multimedia communications applications such as telephony, video telephony, videoconferencing, multimedia distribution applications such as on-demand video, broadcasts, content syndications, consultation applications such as directories, interactive WeB services, information-sharing applications such as peer-to-peer exchanges, distributed databases, and more generally, computer applications of which the elements execute on distant machines and, synchronize themselves and exchange information via the network.

In reference to FIG. 1, the producers 2 and the consumers 4 are connected to a transit network 6 via a plurality of access networks 8.

The participants (machines or users) of an application in a network shown in FIG. 1 have the roles of consumers and of producers of information. These roles can change during the life of an application, for example during a session.

These participants connect to the network at geographical or administrative points and, from a network standpoint, they form a unit referred to as a User. A user can be an agency, a company or a mobile individual. The transports technologies used can be wired or wireless.

This invention takes advantage of the uniformity provided by the telecommunications networks in packet mode which are characterized by the fact that the digital information is transported from one point to another in groups called packets, substantially comprised of a header containing the routing directives and information data. The sequences of packets in the same transfer of information are referred to as the flow of data. These flows are characterized by a time function.

The main technology currently used to access these telecommunications networks in packet mode is the IP protocol (Internet Protocol). This protocol is preserved from end to end even if optimization and encapsulation techniques can on certain segments carry out transport structure translations.

The most widely known examples of telecommunications network segments in packet mode are the DVB networks, the MAC IEEE networks (Ethernet, WiFi, WiMax), the MPLS networks.

The transit network 6 represents a capacity of transport that is substantially shared between a multitude of users and/or private networks. The characteristic of this capacity of transport remains stable as seen from a user standpoint despite the variability of his own consumption or of the production of information that the user may not explicitly inform the network manager of by a change in subscription or an opening/closing of a session.

The access networks 8 represents the limited capacities of transport where the data flows undergo substantial distortions due to the speeds that are much less than those of the sending speeds of the physical terminal elements, or of competitions between users served by an access network 8. These high distortions appear during period of time referred to as congested.

The device of this invention can be introduced at the tie and aggregation points but does not require a generalized deployment.

Figure 2:
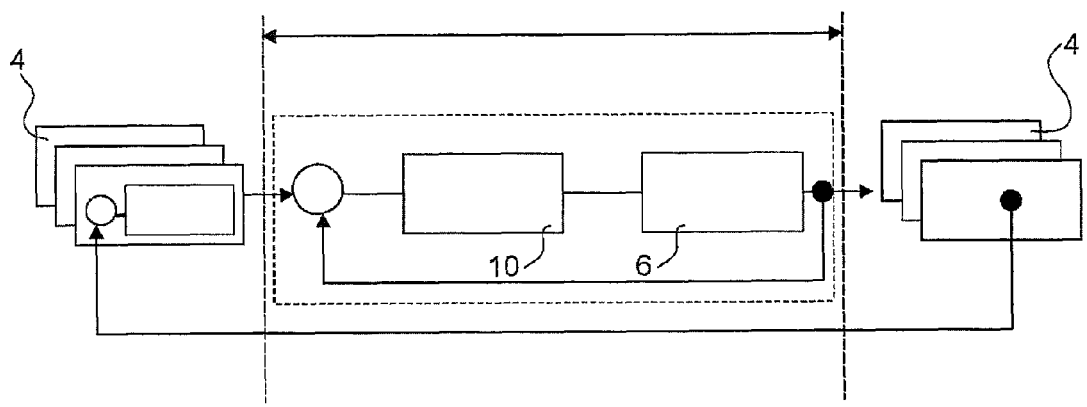
FIG. 2 shows a diagram showing the adaptation of the transfer function for the flows of data.

The mechanism of adaptation of the traffic according to the invention is shown schematically by a short loop shown in FIG. 2 connecting all of the consumers 4 to all of the producers 2 via the network 6.

This loop comprises a module 10 representing a global adapter which adjusts the system in an optimal position by comparing the QoE results obtained with the predefined QoE objectives.

The traffic changes with the consumption of information carried out via the system by all of the consumers 4 from all of the producers 2 as well as with the flow characteristic of the network.

An adaptation of the transfer of information stabilizes the system at an optimal position. This adaptation operates with dynamic parameters of which the values depend on the results observed.

FIG. 2 also shows the possible controls between the participants. These controls carried out on knowledge limited to the sole participants in direct interaction and to their limited perception can slow down their transfer. A well-known example is that of the TCP mechanism defined by IETF (for Internet Engineering Task Force) which restrains the performance as soon as the network uses means of transmission by satellite.

The adaptation implemented can consist of:
a selective acceleration,
a compression of the information,
a suppression of the redundancies and restitution of the information already transferred,
a conditioning of flow,
an adjustment of bandwidth,
a selection of a path in a transit network,
a selection of access network
a selection of transit network.

A known example of selective acceleration is an algorithm modifying the TCP control flow to have a TCP emitter use a higher sending speed.

An ISO SCPS-TP standard has been defined in order to improve the interoperability of the players in transmissions by satellite. The acceleration is selective due to its application to certain flows, for example, the flows flowing via means of transmission by satellite which undergo substantial transmission latency.

Other selection criteria can be introduced so as to improve the QoE rather than improve a priori the network.

This invention relates to the orchestration and the configuration (initial values, target values for the adapting mechanisms, selection criteria for the mechanisms with multiple choices, optimization criteria) of the adapting mechanisms, not the operation of these mechanisms.

Driving the system is conducted by the objectives of QoE and a policy for maximizing the QoE.

In a preferred mode of implementation, the method according to the invention comprises a phase consisting in defining, on the one hand, objectives of QoE representing the expected results in situations of congestion where the system of transfer cannot satisfy maximum performance for each application, and on the other hand, a maximization policy consisting of a model of conduct which defines the arbitration directives and, where applicable, the tactics in order to maintain the system in optimal operation.

To that effect, the method according to the invention is based on transfer algorithms that process the flows of data in a way that is transparent to the applications and best use the capacities of the network. These algorithms are specialized by type of data flow and are implemented in means of adaptation.

Preferentially, the algorithms applied are according to the environment, changing with the needs of the applications, the capacities of the network and the means of adaptation available.

The choice of these algorithms is made according to the performances of QoE obtained and by evaluating the difference with the expected objectives.

Figure 3:
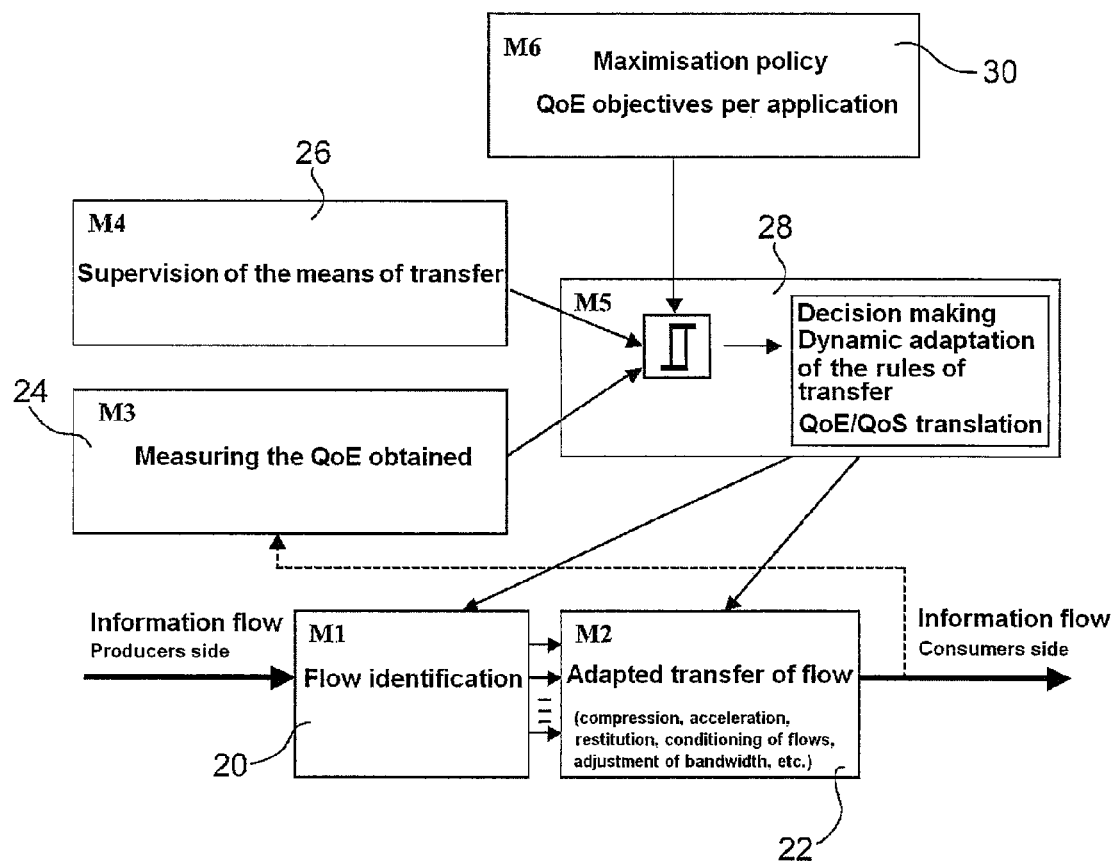
FIG. 3 shows a block diagram of the device according to the invention.

FIG. 3 schematically shows a device allowing for the implementation of the method according to the invention. This device comprises:

a module M1 20 in charge of discriminating the flow of data of producers 2 and of applications $A_k$ making use of said flow, a module M2 22 in charge of adapting the recognized flow of data in order to carry out a transfer of information that complies with the criteria and with the priorities optimising the quality of operation 'QoE' perceived by the consumers 4 of the information, a module M3 24 in charge of quantifying said quality of operation 'QoE' perceived by the consumers 4 of the information, a module M4 26 in charge of estimating the means of transfer available within said network, a module M5 28 in charge of selecting the transfer parameters optimising said quality of operation 'QoE', a module M6 30 in charge of coordinating the preceding modules in order to implement a chosen policy of maximizing the performance of the applications making use of the information exchanged via the network.

Figure 4:
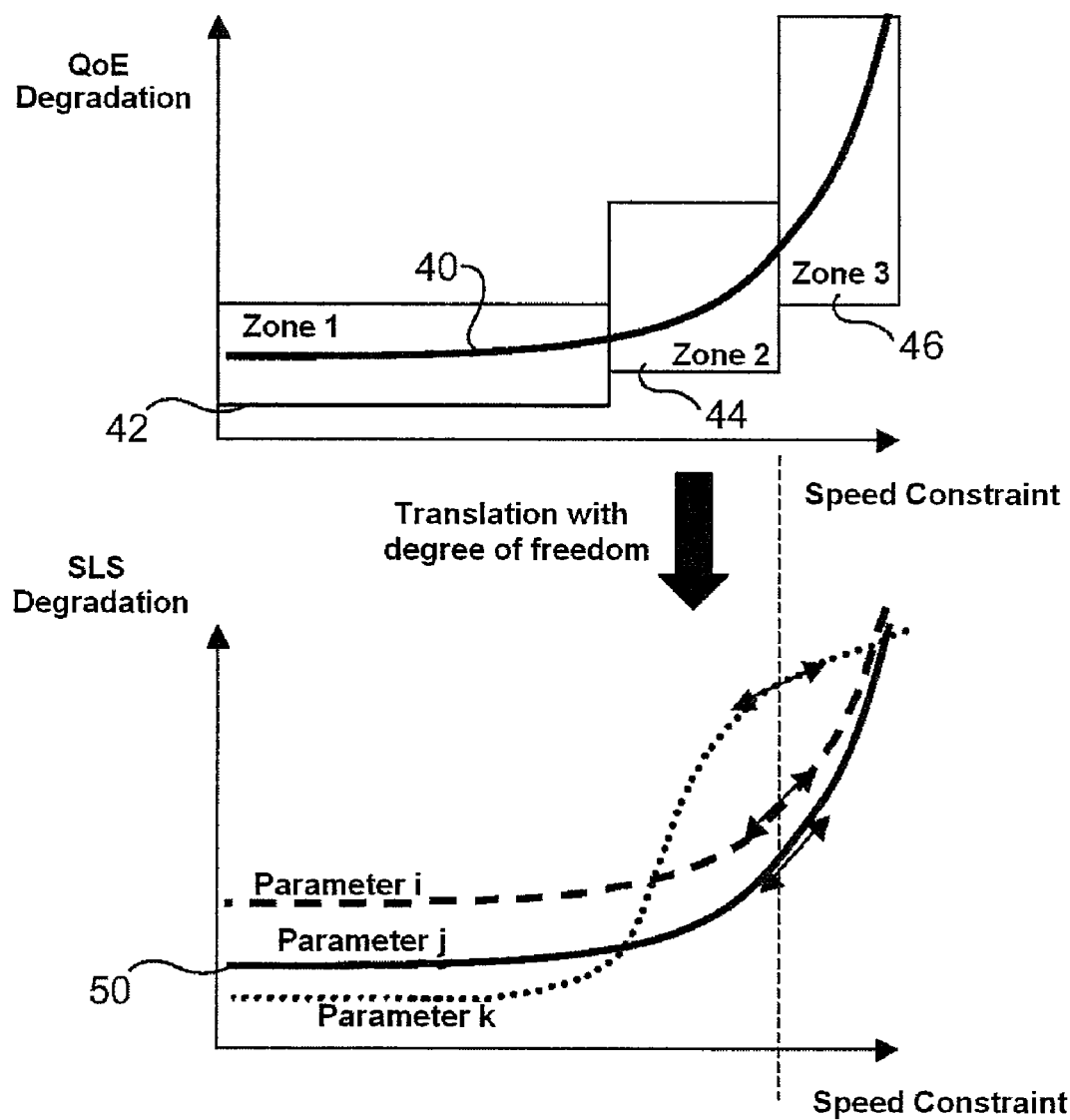
FIG. 4 shows a translation of the QoE indicators into target SLS templates.

FIG. 4 highlights the capacity of adaptation of an automatic translation in actual environment, not a priori, of an objective of QoE into SLS parameters.

The curve 40 shows three zones of operation:

a first zone where the QoE indicator is degraded only very slightly with a transfer function that is more and more restrictive, a second zone 44 where the QoE indicator becomes very sensitive to the transfer function, a third zone 46 where the QoE indicator is highly degraded and goes out of the acceptable limits.

The second curve shows the translation of the QoE into multiple parameters. In particular, this curve shows substantial operating ranges for each of the parameters as well as very different gradients in the zone 44.

Each translation as such creates a space of possible values.

The maximization of the performance of the applications is obtained by self-adapting mechanisms that will monitor the QoE indicators and which stabilize themselves across all of the values of optimal SLS parameters, via successive translations of the reachable QoE indicators into SLS parameters.

As such, instead of adjusting the self-adapting mechanisms on the values of SLS parameters calculated a priori, these mechanisms will make use of the space of possible values in order to better satisfy the totality of the needs.

The elements for the adaptation base can have linear and/or non-linear effects on the SLS parameters.

The first category comprises the conditionings of flows and the adjustment of bandwidth, and the second category, comprises substantially elements referred to as transformation devices.

Figure 5:
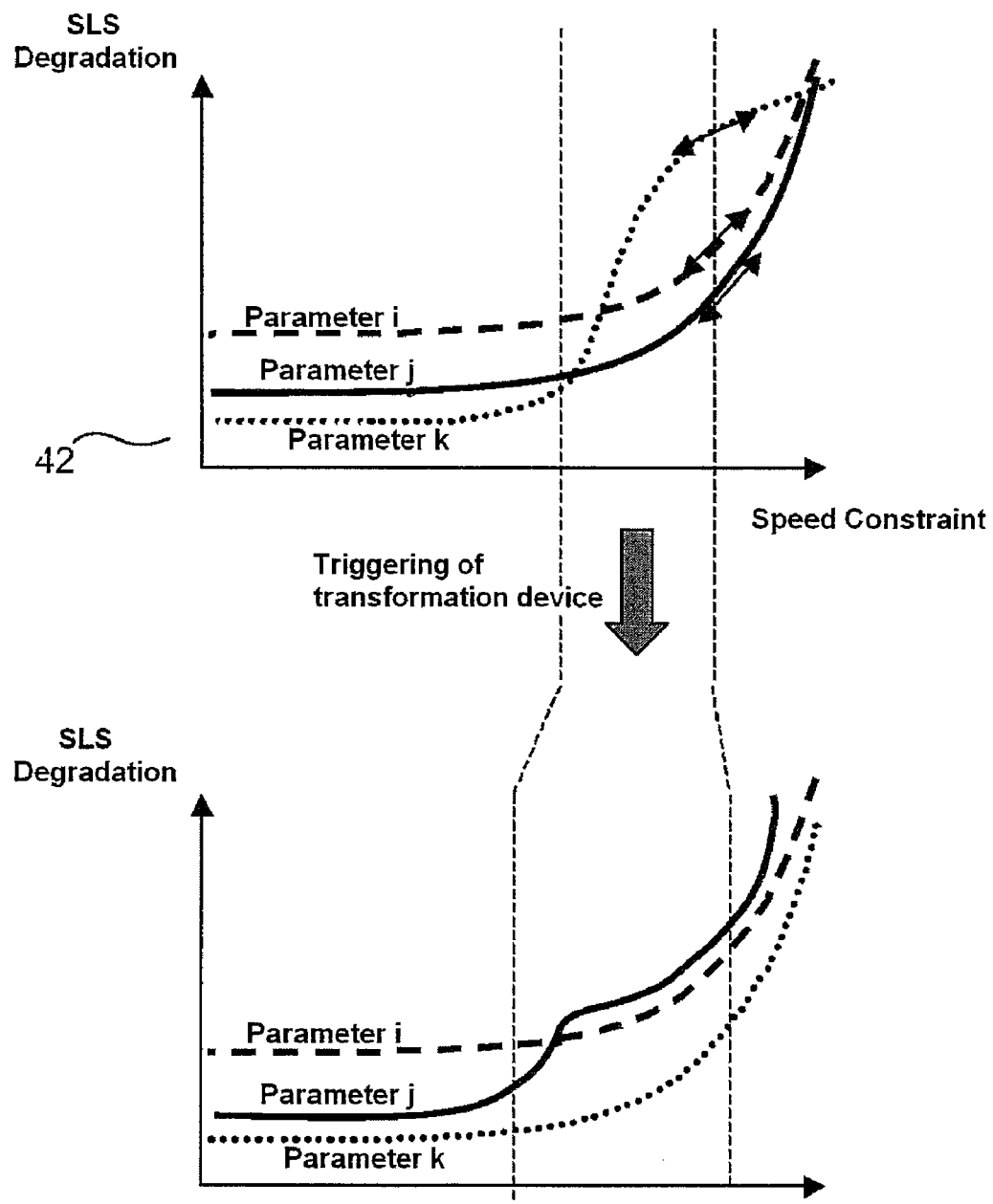
FIG. 5 shows a process of triggering the device for the transformation of the flows driven by the QoE indicators.

FIG. 5 shows the effect of a triggering of a device for transformation such as compression, acceleration, enhancing reliability, etc.

With known mechanisms, the maximization of performance was based solely on the SLS configuration in such a way as to adjust the adaptation mechanisms. This invention makes it possible to dynamically introduce mechanisms that will modify the translation function of QoE into SLS parameters.

Figure 6:
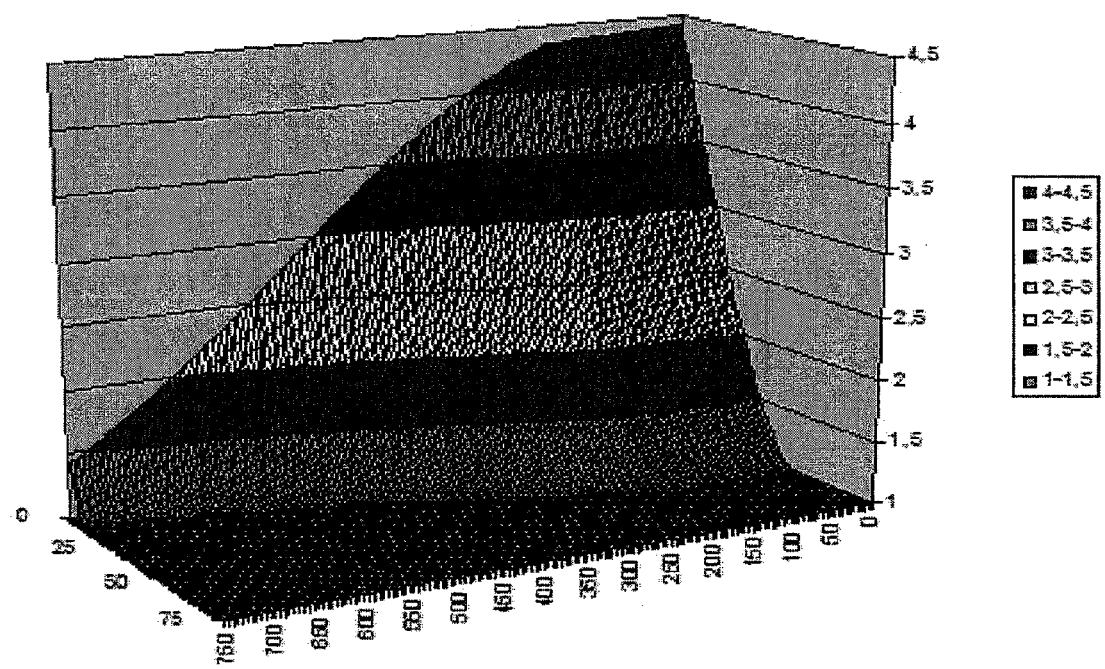
FIG. 6 shows the projection of an auditory QoE (G.711 flow qualified by an MOS ITU) based on two SLS parameters loss and latency.

For example, the observance of a rate of loss that is too high (parameter k in FIG. 6), which causes zone 2 mentioned in FIG. 5 to be left, triggers the implementation of enhancing reliability which does however have the defect of introducing a delay (parameter j in FIG. 6). This triggered implementation modifies the translation function QoE into SLS and as such can enlarge the balanced zone (zone 2) giving more latitude in adjusting the system.

The invention claimed is:

1. A method for optimising the transfer of information in a telecommunications network comprising a plurality of producers of information Pi, a plurality of consumers of information Cj, and means of transfer of said information between said producers and said consumers within a framework of a plurality of applications $A_k$, the method comprising:
(a) defining an objective of quality of experience QoE representing a capacity of a consumer Cj to make use of information transferred within the framework of each application Ak implemented in the network and a level of Criticality of the Consumers Cj and/or of the Applications Ak representing relative importance of said Applications Ak and/or of said Consumers Cj;
(b) determining continuously at least one parameter representing an actual quality of experience 'QoE' for at least one consumer;
(c) determining dynamically, operating instructions for the transfer of information from the producers Pi to the consumers Cj according to a means of transfer available and;
(d) adapting dynamically and continuously said means of transfer of information according to the instructions defined in step (c);
wherein said adaptation of the means of transfer of step (d) further comprises
adjusting dynamically, operating instructions for the transfer of information according to effects on the transfer of mechanisms for selective acceleration, compression, and enhancing reliability,
adjusting dynamically based on an impact on quality of operation 'QoE' perceived by the consumer of the information; and
adjusting dynamically, operating parameters of mechanisms for selective acceleration, compression, and protection so as to reduce a load omitted into the network while maintaining control of the quality of operation 'QoE' perceived by the consumer of the information.

2. The method according to claim 1, further comprising:
   determining rules of arbitration between different data flow exchanged via the network for the use of the means of transfer;
   determining rules for using said means of transfer in such a way so as to allocate said means according to a type of flow;
   determining types of adaptation of flows to be carried out during the transfer; and
   configuring each adaptation defined in the preceding step in such a way as to make use of a space of possible values of said operating parameters to satisfy a totality of needs of the applications making use of the information transmitted via the network.

3. The method according to claim 1, wherein in the event of a flow controlled from end to end, said adaptation further comprises performing at least one selective acceleration using resources of the network to optimize the performance of the applications using information transmitted via the network.

4. The method according to claim 1, wherein in the event of a flow with high data redundancy, said adaptation further comprises performing at least one compression of information transiting via the network.

5. The method according to claim 1, wherein in the event of a set of flows with redundant information, said adaptation further comprises restitution of the information by an indexing and a temporary memorisation of redundant information.

6. The method according to claim 1, wherein in the event of elastic flows, said adaptation further comprises performing a dynamic distribution of input flows in the network for each type of flow.

7. The method according to claim 1, wherein in the event of a flow exchanged in real time, said adaptation further comprises performing at least one optimization of integrity of the information by mechanisms for enhancing reliability.

8. The method according to claim 1, wherein in the event of a flow that can flow via several paths, said adaptation further comprises selecting an optimal path.

9. The method according to claim 1, wherein, in the event of audio data transfers, the at least one parameter representing the quality of operation 'QoE' is the MOS (Mean Opinion Score) measured by algorithms for estimating audible quality.

10. The method according to claim 1, wherein, in the event of video data transfers, the at least one parameter representing the quality of operation 'QoE' is an MDI (Media Delivery Index) measured by algorithms for estimating visual quality.

11. The method according to claim 1, wherein, in the event of applications proceeding with client-server interactions, the at least one parameter representing the quality of operation 'QoE' is transaction delay characterised by a latency of the consumer between sending of his query to a producer of data and receiving a last information unit produced for said query.

12. The method according to claim 1, wherein, in the event of a transfer of information in the form of packets transmitted without dynamic transformation taking into account a state of the network, a of the Producer-Consumer synchronization or the content of said packets, the at least one parameter representing the quality of operation 'QoE' is one of an absolute transfer latency of the packets, a jitter of said packet, a packet loss rate, and a transfer speed.

13. The method according to claim 1, wherein, in all cases wherein a multiplicity of indicators intervenes in order to characterize perceived performance, the at least one parameter representing the quality of operation 'QoE' is an AQS (for Application Quality Score) index representing a rate of availability of the totality of performance objectives set for a given application.

14. A device for optimizing the transfer of information in a telecommunications network that includes a plurality of producers of information, a plurality of consumers of information, and means of transfer of said information between said producers and said consumers, said device comprising:
   a flow discriminator which discriminates a flow of data of producers and of applications making use of said flow;
   an adapter which adapts a recognized flow of data to carry out a transfer of information that complies with criteria and priorities selected for optimizing a quality of operation 'QoE' perceived by a consumer of the information;
   a qualifier which qualifies said quality of operation 'QoE' perceived by the consumer of the information and which is configured to continuously determine at least one parameter representing an actual quality of experience 'QoE' for at least one consumer;
   an estimator which estimates a means of transfer available within said network;
   a selector which selects transfer parameters optimizing said quality of operation 'QoE' and which is configured to define an objective of quality of experience QoE representing a capacity of a consumer $C_j$ to make use of information transferred within the framework of each application $A_k$ implemented in the network and a level of Criticality of the Consumers $C_j$ and/or of the Applications $A_k$ representing a relative importance of said Applications $A_k$ and/or of said Consumers $C_j$; and
   a coordinator which controls the flow discriminator, the adapter, the qualifier, the estimator, and the selector to implement a chosen policy of maximizing the performance of the applications making use of information exchange via the network, and which is configured to dynamically determine operating instructions of the transfer of information from the producers Pi to the consumers $C_j$ according to the means of transfer available.

15. A device as set forth in claim 14, wherein to select the transfer parameters that optimize said quality of operation 'QoE', said selector uses one of fuzzy logic based processing, Bayesian network based processing, decision tree based processing, neural network based processing, and empirical model based processing.

* * * * *